United States Patent [19]
Geis et al.

[11] Patent Number: 6,049,195
[45] Date of Patent: Apr. 11, 2000

[54] SPLIT GENERATOR WINDING INVERTER

[75] Inventors: Everett R. Geis, Trabuco Canyon; Brian W. Peticolas, Redondo Beach; Joel B. Wacknov, Monrovia, all of Calif.

[73] Assignee: Capstone Turbine Corporation, Woodland Hills, Calif.

[21] Appl. No.: 09/356,065

[22] Filed: Jul. 19, 1999

Related U.S. Application Data

[62] Division of application No. 09/002,890, Jan. 5, 1998.

[51] Int. Cl.[7] .................................. H02P 11/06; H02P 9/00
[52] U.S. Cl. ................................................. 322/46; 363/37
[58] Field of Search ................................. 322/10, 12, 28, 322/46, 59, 89, 90; 318/140; 363/37

[56] References Cited

U.S. PATENT DOCUMENTS

| | | | |
|---|---|---|---|
| 4,968,926 | 11/1990 | Dyanchand | 322/10 |
| 5,015,941 | 5/1991 | Dyanchand | 322/10 |
| 5,031,086 | 7/1991 | Dhyanchand et al. | 363/37 |
| 5,512,811 | 4/1996 | Latos et al. | 322/10 |
| 5,625,276 | 4/1997 | Scott et al. | 322/24 |
| 5,903,116 | 5/1999 | Geis et al. | 318/140 |
| 5,942,818 | 8/1999 | Satoh et al. | 310/46 |

*Primary Examiner*—Nicholas Ponomarenko
*Attorney, Agent, or Firm*—Albert J. Miller

[57] ABSTRACT

A permanent magnet generator having a winding split into two equal windings with each of the two windings connected to a separate three phase rectifier block of a pulse width modulated inverter The pulse width modulated inverter includes three (3) IGBT channels across the voltage bus with the neutral created between the separate three phase rectifier blocks.

3 Claims, 2 Drawing Sheets

6,049,195

SPLIT GENERATOR WINDING INVERTER

This application is a division of application Ser. No. 09/002,890, filed Jan. 5, 1998, (pending).

TECHNICAL FIELD

This invention relates to the general field of inverters and more particularly to an improved inverter configuration for a generator/motor.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

As high energy product permanent magnets having significant energy increases have become available at reduced prices, the utilization of the permanent magnet generator/motors has increased. Samarium cobalt permanent magnets having an energy product of twenty-seven (27) megagauss-oersted (mgo) are now readily available and neodymium-iron-boron magnets with an energy product of thirty-five (35) megagauss-oersted are also available. Even further increases of mgo to over 45 megagauss-oersted promise to be available soon. The use of such high energy product permanent magnets permits increasingly smaller machines capable of supplying increasingly higher power outputs.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from recuperator.

In order to start the turbogenerator, electric current is supplied to the stator coils of the permanent magnet generator/motor to operate the permanent magnet generator/motor as a motor and thus to accelerate the gas turbine of the turbogenerator. During this acceleration, spark and fuel are introduced in the correct sequence to the combustor and self-sustaining gas turbine conditions are reached.

At this point, the inverter is disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. A microprocessor can monitor turbine conditions and control fuel flow to the gas turbine combustor.

In order to produce three phase, four wire utility grade power from the turbogenerator, there must be allowance for single phase loads. In order to accomplish this, the turbogenerator power converter must include an inverter which has a neutral. One way that pulse width modulated inverters establish a neutral is by providing a fourth channel of Integrated Gate Bipolar Transistors (IGBT) switches and associated gate drives and output filter inductor. By switching the IGBT's in this fourth channel to a fifty percent (50%) duty cycle, an artificial neutral connection is created which is exactly at the mid point of the DC bus potential.

An example of such a system is described in U.S. patent application Ser. No. 924,966, filed Sep. 8, 1997 by Everett R Geis and Brian W. Peticolas entitled "Turbogenerator/Motor Controller", assigned to the same assignee as this application and incorporated herein by reference. While this approach to establish a neutral is quite functional, its cost in increased components, such as the solid state transistors, associated gate drives, and output filter inductor, makes such a system relatively expensive to produce.

SUMMARY OF THE INVENTION

In the present invention, the permanent magnet generator winding is split into two equal windings with each of the two windings connected to a separate three phase rectifier block of a pulse width modulated invert er. The pulse width modulated inverter includes three (3) IGBT channels across the voltage bus with the neutral created between the separate three phase rectifier blocks.

BRIEF DESCRIPTION OF THE DRAWINGS

Figure 1:
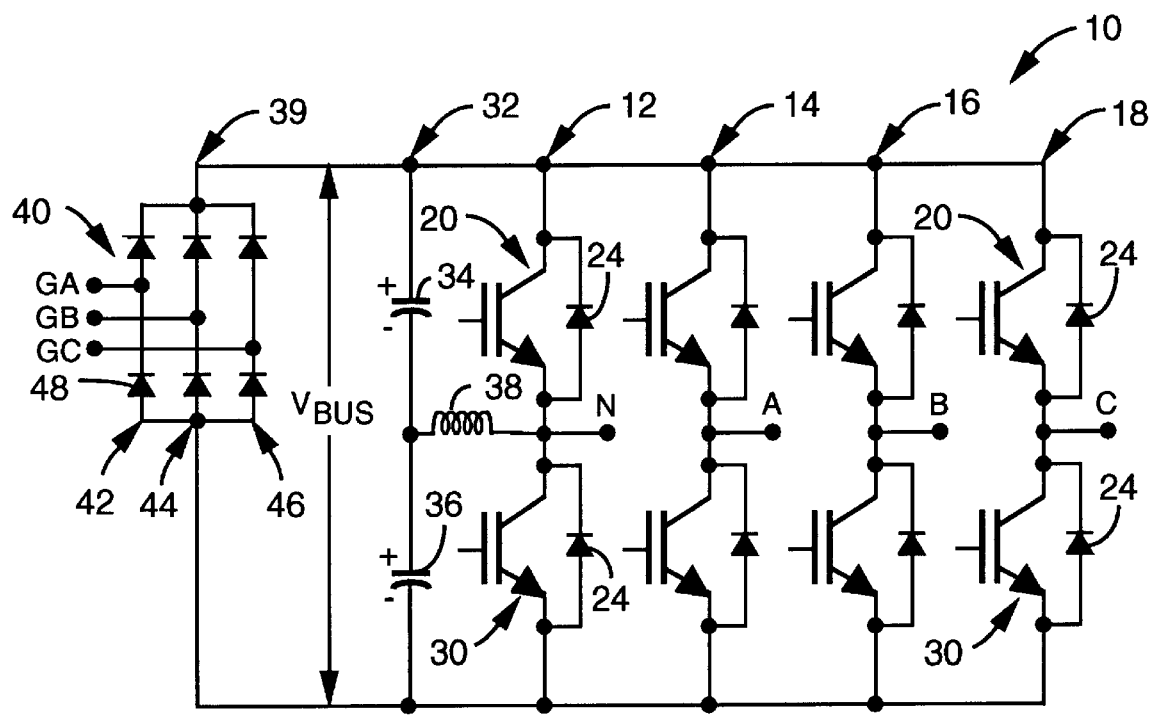
Figure 2:
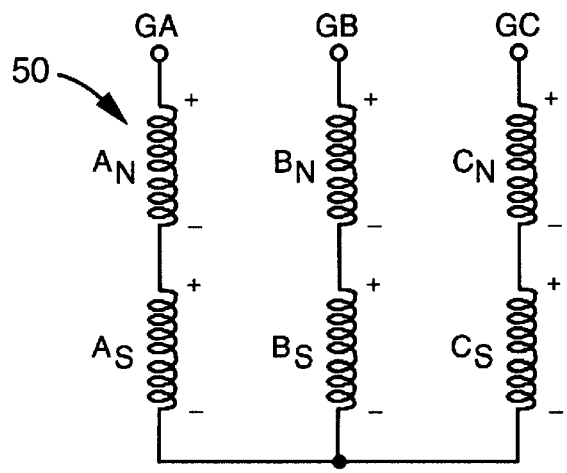
Figure 3:
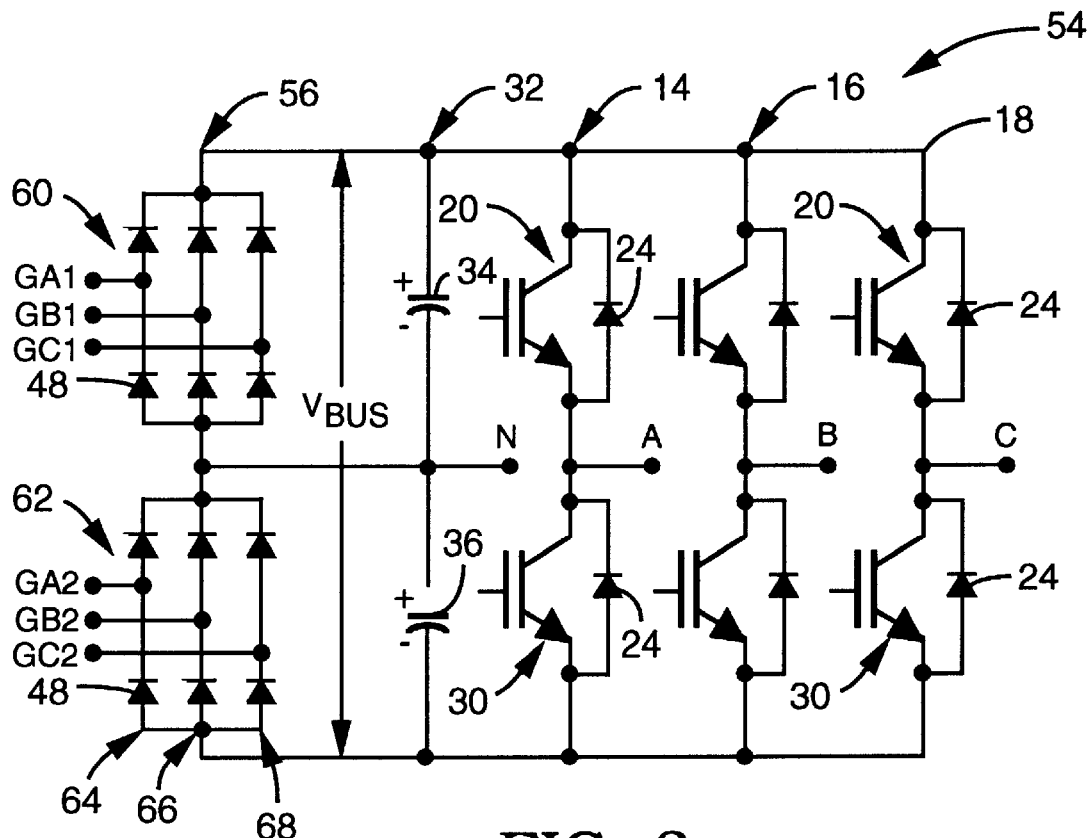
Figure 4:
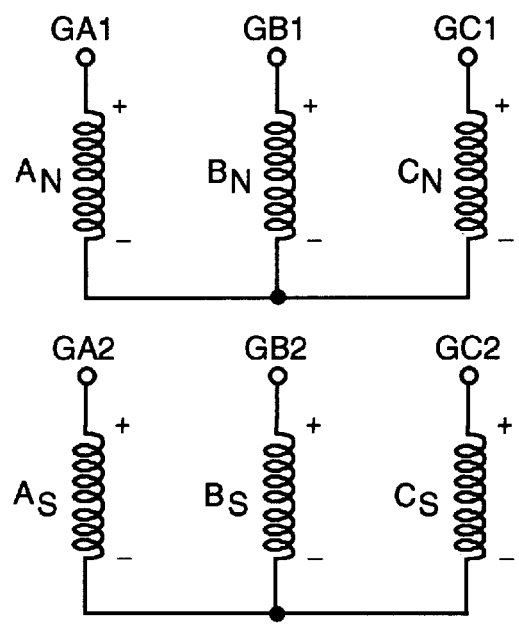

Having thus described the present invention in general terms, reference will now be made to the accompanying drawings in which:

FIG. 1 is schematic view of a current pulse width modulated inverter;

FIG. 2 is a schematic view of a current generator winding;

FIG. 3 is schematic view of the split generator winding pulse width modulated inverter of the present invention; and FIG. 4 is a schematic view of the split generator winding of the present invention.

DETAILED DESCRIPTION OF THE PREFERRED EMBODIMENTS

A current pulse width modulated inverter 10 is illustrated in FIG. 1. This inverter 10 illustrates four IGBT channels 12, 14, 16, and 18 each across the voltage bus $V_{bus}$, but these may be any number of different solid state switching devices. Each IGBT channel 12, 14, 16, and 18 includes a positive section IGTB 20 with an anti parallel diode 24 and a negative section IGBT with an identical anti parallel diode 24.

This pulse width modulated inverter 10 also includes a capacitor channel 32 also across the voltage bus $V_{bus}$. The capacitor channel 32 includes positive section capacitor 34 and negative section capacitor 36 with the midpoint between positive section capacitor 34 and negative section capacitor 36 connected to the midpoint of IGBT channel 12 through inductor 38. The neutral connection N is at the midpoint of IGBT channel 12 while the midpoints of IGBT channels 14, 16, and 18 provide output connections A, B, and C, respectively.

In addition, this inverter 10 includes a rectifier block channel 39 which is also across the voltage bus $V_{bus}$. This rectifier block channel 39 includes a three phase rectifier block having three (3) diode channels 42, 44, and 46 each including a pair of diodes 48. The midpoints of each pair of diodes 48 are connected to generator windings $G_A$, $G_B$, and $G_C$, respectively.

Current generator windings 50 are illustrated in FIG. 2. Winding A comprises a positive section winding AN and negative section winding As in series with windings B and C each also including a positive section and negative section winding. The generator winding connections $G_A$, $G_B$, and $G_C$ are connected to the three phase rectifier block 40 of FIG. 1.

The pulse width modulated inverter 54 of the present invention is illustrated in FIG. 3. This inverter 54 includes IGBT channels 14, 16, and 18 and capacitor channel 32 from the current inverter 10. Eliminated, however, are IGBT channel 12 and inductor 38. The inverter 54 of the present invention also includes a rectifier block channel 56 across the voltage bus $V_{bus}$. This rectifier block channel 56 includes an positive section three phase rectifier block 60 and a negative section three phase rectifier block 62 with each rectifier block 60 and 62 having three (3) diode channels 64, 66, and 66 each including a pair of diodes 48. The midpoints of positive section diode channels 64, 66, and 68 are connected to generator windings $G_{A1}$, $G_{B1}$, and $G_{C1}$, respectively while the midpoints of negative section diode channels 64, 66, and 68 are connected to generator windings $G_{A2}$, $G_{B2}$, and $G_{C2}$, respectively.

FIG. 4 illustrates the generator windings of the present invention. Rather than having the positive section and negative section windings connected as illustrated in FIG. 2, winding A comprises a separate positive section winding $A_N$ and a separate negative section winding $A_S$ with windings B and C similarly are split into separate positive section and negative section windings. The positive section generator windings $A_N$, $B_N$, and $C_N$ have connections $G_{A1}$, $G_{B1}$, and $G_{C1}$, respectively, connected to positive section three phase rectifier block 60. Similarly, negative section generator windings $A_S$, $B_S$, and $C_S$ have connections $G_{A2}$, $G_{B2}$, and $G_{C2}$, respectively, connected to negative section three phase rectifier block 62.

In this manner, the neutral can be readily established without the need for additional expensive solid state components.

While specific embodiments of the invention have been illustrated and described, it is to be understood that these are provided by way of example only and that the invention is not to be construed as being limited thereto but only by the proper scope of the following claims.

What we claim is:

1. A method of establishing a neutral for a pulse width modulated inverter supplying voltage from a permanent magnet generator/motor, comprising the steps of:

splitting the permanent magnet generator/motor magnet windings into separate and equal positive section magnetic windings and negative section magnetic windings;

connecting the positive section magnetic windings to a positive section rectifier bridge; and connecting the negative section magnetic windings to a negative section rectifier bridge, with the neutral established between the positive section rectifier bridge and the negative section rectifier bridge.

2. A pulse width modulated inverter, comprising:

a permanent magnet generator/motor having separate and equal positive section magnetic windings and negative section magnetic windings;

a positive section rectifier bridge connected to said positive section magnetic windings; and a negative section rectifier bridge connected to said negative section magnetic windings, with a neutral established between said positive section rectifier bridge and said negative section rectifier bridge.

3. The pulse width modulated inverter of claim 2 wherein said positive section rectifier bridge includes a plurality of diode channels each having a pair of diodes and said negative section rectifier bridge includes a plurality of diode channels each having a pair of diodes and said positive section magnetic windings are connected to said positive section rectifier bridge between each of said pair of diodes and said negative section magnetic windings are connected to said negative section rectifier bridge between each of said pair of diodes.

* * * * *

UNITED STATES PATENT AND TRADEMARK OFFICE
CERTIFICATE OF CORRECTION

PATENT NO : 6,049,195
DATED : April 11, 2000
INVENTOR(S) : Everett R. Geis et al.

It is certified that error appears in the above-identified patent and that said Letters Patent is hereby corrected as shown below:

Column 2, line 12, after "R" insert --.--
Column 2, line 25, change "invert er" to --inverter--
Column 3, line 4, change "AN" to --$A_N$--
Column 3, line 5, change "As" to --$A_S$--

Signed and Sealed this

Twentieth Day of February, 2001

NICHOLAS P. GODICI

Attest:

Attesting Officer

Acting Director of the United States Patent and Trademark Office